United States Patent [19]

Vorlop et al.

[11] Patent Number: 5,122,496

[45] Date of Patent: Jun. 16, 1992

[54] CATALYST FOR REMOVING THE NITRITE AND/OR NITRATE CONTENT IN WATER

[75] Inventors: Klaus-Dieter Vorlop; Thomas Tacke, both of Braunschweig; Michael Sell, Peine; Günther Strauss, Hanover, all of Fed. Rep. of Germany

[73] Assignee: Solvay Umweltchemie GmbH, Hannover, Fed. Rep. of Germany

[21] Appl. No.: 576,834

[22] Filed: Sep. 4, 1990

Related U.S. Application Data

[62] Division of Ser. No. 404,988, Sep. 11, 1989, Pat. No. 4,990,266.

[30] Foreign Application Priority Data

Sep. 10, 1988 [DE] Fed. Rep. of Germany ....... 3830850

[51] Int. Cl.⁵ .......................... B01J 23/44; B01J 23/46; B01J 23/66; B01J 23/72
[52] U.S. Cl. ..................... 502/245; 502/261; 502/262; 502/325; 502/331; 502/332; 502/333; 502/339
[58] Field of Search ............... 502/245, 261, 262, 325, 502/331, 332, 333, 339

[56] References Cited

U.S. PATENT DOCUMENTS

| | | | |
|---|---|---|---|
| 3,617,579 | 11/1971 | Gunderloy et al. | 210/59 |
| 4,082,697 | 4/1978 | Tamm | 502/332 X |
| 4,119,571 | 10/1978 | Hegedus et al. | 502/333 |
| 4,526,870 | 7/1985 | Müller | 436/110 |

Primary Examiner—W. J. Shine
Attorney, Agent, or Firm—Foley & Lardner

[57] ABSTRACT

A catalyst is disclosed made from a porous inorganic carrier material impregnated with a metal component selected from palladium, rhodium, mixtures of palladium and rhodium, and mixtures of palladium and a metal of the copper group, in which the carrier has a bimodal pore radius distribution with a first pore radius distribution maximum in the range of up to 400 Å, preferably 50 to 350 Å, and with a proportion of at least 20%, relative to the overall pore volume, of macropores having a radius of at least 2,000 Å, preferably 5,000 to 20,000 Å.

19 Claims, 1 Drawing Sheet

CATALYST FOR REMOVING THE NITRITE AND/OR NITRATE CONTENT IN WATER

This application is a division of application Ser. No. 07/404,988, filed Sep. 11, 1989, now U.S. Pat. No. 4,990,266.

BACKGROUND OF THE INVENTION

The present invention relates to the removal or reduction of the nitrite and/or nitrate content in water.

The nitrite and/or nitrate contents found in ground and surface water in the Federal Republic of Germany have increased greatly in recent years. They vary considerably depending on location and may in places exceed the maximum acceptable levels. For drinking water, in the newest EEC regulations, a permissible limit value of 50 mg nitrate/l is recommended, and a limit value of 0.1 mg/l for nitrite. The increasing nitrate and nitrite contents in much ground and surface water make processes for removing nitrites and nitrates increasingly necessary in the treatment of drinking water.

The principal techniques available for removing nitrites and nitrates from drinking water are biological processes and physical/chemical measures in the field of water desalination. In biological de-nitrification, bacteria are used which in the absence of oxygen process nitrite and nitrate as a terminal hydrogen acceptor. The disadvantage of this process is the risk of contaminating the drinking water with bacteria or their metabolic products, so that subsequent cleaning of the water treated in this way is necessary. In physical salt separation, the problem is simply shifted elsewhere, as nitrite-rich and/or nitrate-rich waste waters are obtained which then have to be disposed of themselves. Accordingly, the removal of nitrites and/or nitrates from water has hitherto involved relatively high costs.

SUMMARY OF THE INVENTION

An object of the present invention is to provide an improved process for removing nitrite and/or nitrate from water.

It is also an object of the present invention to provide a process for removing nitrite and/or nitrate from water which can be carried out economically.

A particular object of the invention is to develop a chemical process for removing nitrite and/or nitrate from nitrite-polluted and/or nitrate-polluted waters, which can be carried out under conventional water treatment conditions.

Another object of the invention is to provide a process for removing nitrite and/or nitrate from water in which gaseous products, particularly nitrogen, are formed from the nitrite and/or nitrate content without the water becoming polluted with undesired amounts of ammonium.

A further object of the invention is to provide a process for removing nitrite and/or nitrate from water which can be performed continuously.

These and other objects of the invention are achieved by providing a process for removing nitrite and/or nitrate from nitrite-polluted and/or nitrate-polluted water with the selective formation of nitrogen, comprising the steps of introducing hydrogen into the nitrite and/or nitrate-polluted water, and contacting the water loaded with hydrogen with a metal catalyst formed of a porous carrier impregnated with a metal component consisting of palladium and/or rhodium or of palladium and a metal of the copper group, wherein said carrier a) has a bimodal pore radius distribution having a proportion of at least 20%, relative to the overall pore volume, of macropores having a minimum radius of 2,000 Å and/or b) has a non-homogenous distribution of the metal with a concentration in the surface area or c) is a powder, and wherein, for treating water polluted only with nitrite, a catalyst is used which comprises a metal component comprising palladium and/or rhodium, and for treating water which additionally contains nitrate, a catalyst is used which comprises a metal component comprising palladium and a metal of the copper group, or comprising rhodium and optionally palladium, or a mixture of a catalyst which comprises a metal component comprising palladium and a metal of the copper group, and a catalyst which comprises a metal component consisting solely of palladium, and wherein the pH value of the water is maintained not greater than pH 8.

In accordance with a preferred aspect of the invention the process is repeated as often as necessary until the nitrite and/or nitrate content of the water is decreased to an acceptable value.

According to a further aspect of the invention, a particularly suitable catalyst is provided for carrying out the foregoing process, which is formed of a porous inorganic carrier material having a bimodal pore radius distribution with a proportion of at least 20%, relative to the overall pore volume, of macropores having a minimum radius of 2,000 Å and impregnated with at least one metal component selected from the group consisting of palladium, rhodium, and mixtures of palladium and a metal of the copper group.

Thus, in accordance with the invention, a continuously performable catalytic reduction process has been discovered with which nitrite and/or nitrate can be removed from water, forming non-toxic, gaseous reduction products, predominantly nitrogen, and largely avoiding the formation of ammonium ions, and which can be used in particular for treating nitrite-polluted and/or nitrate-polluted ground water, river water, spring water or industrial waste waters, for example in the production of industrial water for the food and beverage industry or of drinking water, and for removing nitrite and/or nitrate from drinks such as mineral water or fruit juices.

In accordance with the present invention, nitrite-polluted or nitrate-polluted water and aqueous solutions of any origin can be treated, provided they are free of appreciable amounts of substances which can be reduced under the reaction conditions of the process of the invention and are free of substances which are known to act as poisons for palladium-containing, rhodium-containing or copper-containing catalysts, or which may attack the carrier material. In the present application, the term "water" refers to such waters and aqueous solutions. The nitrite and/or nitrate content which can be removed or reduced to a tolerable level using the process of the invention may vary within a wide range. For instance, water with a nitrite and/or nitrate content of between 0.1 mg/l and several grams per liter can be treated using the process according to the invention. The present invention is particularly suitable for removing the nitrite and/or nitrate content from water having a low nitrite and/or nitrate content, for instance in the range of about 0.1 to about 20 mg/l nitrite and/or about 10 to 300 mg/l nitrate.

In particular, the process according to the invention is used for removing nitrite and/or nitrate from water which corresponds in its degree of purity to water which has undergone natural filtration. Such water may contain water-soluble substances, e.g. inorganic salts, in orders of magnitude such as may be found in ground water, for instance, up to several grams per liter. Examples of nitrite-polluted or nitrate-polluted waters to be treated by the process according to the invention include, for example, ground water, well water, spring water or seepage water or other waste waters which have already been pre-purified accordingly, for instance industrial waste waters, for instance from flue gas cleansing, but also drinks such as mineral waters, soft drinks and fruit juices.

The process is suitable, for instance, for use in treatment of drinking water and preparation of industrial water for the foodstuffs or drinks industry and for other purposes for which low-nitrite and/or low-nitrate or nitrite-free and/or nitrate-free and oxygen-free or low-oxygen water is required.

The catalytic reduction of nitrite and of nitrate to nitrogen with hydrogen may be summarized by the following equations:

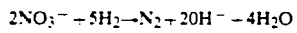

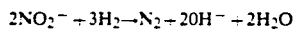

In the reduction, therefore, a quantity of hydroxyl ions which is equivalent to the reduced quantity of nitrite and/or nitrate is released. This leads to an increase in the pH value of the water treated which is dependent on the quantity of the nitrite and nitrate to be reduced or the hydrogen available for reduction.

Advantageously, the pH value of the water is adjusted so that the increase caused by the reaction does not lead to values of above pH 8, preferably not above about pH 7. The pH value may be adjusted, for instance, by adding an aqueous solution of an acid, preferably a dilute inorganic acid such as hydrochloric acid, for instance, 0.1-1 n-hydrochloric acid, or $CO_2$.

The introduction of the hydrogen gas into the water and a possibly necessary pH adjustment may take place, if desired, while the water is in contact with the catalyst. For this purpose, the water may be introduced into a reaction vessel containing the catalyst and be gassed therein with hydrogen. In this process, hydrogen consumed in the reaction can be continuously replaced by continued gassing.

Advantageously, however, the hydrogen gas is introduced into the water in a separate gassing vessel before the water is brought into contact with the catalyst. In this case, it is desirable to also adjust the pH value of the water to be treated before gassing with hydrogen, so that the subsequent increase in pH remains within the desired range, and/or to adjust the pH value of the water to the desired range while it is in contact with the metal catalyst, preferably to keep it approximately constant. Preferably, the pH value of the water to be treated is adjusted to from about 2 to 8, particularly from about 4 to 7.

In addition to nitrite and/or nitrate, the dissolved oxygen in the polluted water is also decreased under the conditions of the process of the invention. In order to remove the nitrite and/or nitrate content of the water completely, therefore, a total quantity of hydrogen gas is required which at least corresponds to the stoichiometrically required amount for reduction of the oxygen content and the nitrite and/or nitrate content of the water. For instance, in theory about 9 mg hydrogen are required for the reduction of 100 mg nitrate. If the water to be treated only contains small quantities of nitrite and/or nitrate, it is advantageous to add a quantity of hydrogen which corresponds at least to the stoichiometrically calculated quantity and at most to a 20% excess of this calculated quantity.

The gassing of the water with hydrogen may take place in known manner, for instance via gas saturators, it being essential, however, for the hydrogen to be introduced in as fine bubbles as possible and without the formation of large gas bubbles, and to be evenly distributed throughout the water. Permeation gassing, which is known per se, has proved particularly suitable. In this technique, the gas is introduced into the water through a fixed membrane, for example, a silicone rubber membrane. Non-reinforced or fabric-reinforced silicone hoses or flat membranes may be used for this purpose. An important feature of permeation gassing is the bubble-free introduction of gas, due to the mass transfer in the pore-free membrane material taking place exclusively through diffusion and solubility processes. Another advantage of permeation gassing is that the introduction of the gas may be increased by simply increasing the partial gas pressure in the membrane system. This proves advantageous if larger quantities of hydrogen are required. In addition, it is advantageous to stir the water to improve the distribution of the hydrogen in the water.

The process of the invention may operate at normal pressure or slightly elevated pressure, e.g. up to 10 atmospheres. The solubility of the hydrogen gas in the water is below 2 mg/l at standard pressure and temperatures between 10° and 25° C. and is also doubled when the pressure is doubled. When correspondingly larger quantities of hydrogen are required for the reduction of higher quantities of nitrite or nitrate, it is therefore recommended to carry out the gassing under pressure.

If the gassing of the water with hydrogen and the contact with the catalyst take place simultaneously, the water is brought into contact with the catalyst for a sufficient time to reduce the nitrite and/or nitrate to nitrogen. Desirably, the contact times should not substantially exceed the required time, as longer contact times could favor the further reduction of the nitrogen past the zero stage into ammonium. The hydrogen gassing rate may vary depending on the type of the catalyst and the level of the nitrite and/or nitrate content to be reduced and the amount of water to be passed through, and may be, for example, between 1 and 500 ml $H_2$/min. Lower gassing rates contribute to substantial avoidance of $NH_4$ formation.

If the gassing of the water with hydrogen and the contacting of the water loaded with hydrogen take place separately and successively, the contact of the water with the catalyst advantageously takes place in a catalyst containing reactor, which is preferably designed as a fixed bed reactor, a fluidized bed reactor or a moving bed reactor. The flow rate will vary depending on the degree of nitrite and/or nitrate pollution of the water and the nitrite and/or nitrate conversion capacity of the catalyst used.

If the oxygen content and the nitrite and/or nitrate content of the water are so high that even when the water is saturated with hydrogen gas at a slightly elevated pressure, it is not possible to introduce a sufficient quantity of hydrogen to reduce the entire content of oxygen and nitrite and/or nitrate, only part of the nitrite and/or nitrate content will be removed when the hydrogen-loaded water is subsequently contacted with the catalyst. The water which has been relieved of part of its load is then subsequently gassed again with hydrogen and brought into contact with the catalyst, care again being taken that the pH value does not rise above pH 8. The process is performed successively as often as necessary until a sufficient reduction, e.g. to values which are acceptable for drinking water, i.e. values which are below the recommended limit values for drinking water, or a complete removal of the nitrite and/or nitrate content of the water is achieved.

If desired, for this purpose the water may pass successively through a plurality of reaction units, which each contain a gassing vessel and a reactor and which are arranged in a cascade-like series with an interposed pH-measuring and adjusting cell. In so doing, the pH value of the water may optionally be re-adjusted as it passes from one reaction unit into the following reaction unit. In another embodiment of the process, water which has not had its nitrite and/or nitrate content completely removed in a first pass through the gassing vessel and the reactor may also be recycled into the reaction circuit.

The process of the invention can be controlled, for example through the quantity of hydrogen used, in such a way that any residual concentration of the original nitrite and/or nitrate content in the water treated can be adjusted to a desired value.

The temperature may be between about 5° and 40° C., preferably between 10° and 25° C.

Metal catalysts formed from a porous carrier material impregnated with the metal component are used for the process of the invention. Palladium and/or rhodium are used as metal components if only nitrite is to be removed from the water. If the water also contains nitrate, palladium in combination with a metal of the copper group is used or also rhodium is used. Copper and silver are particularly suitable as metals of the copper group. Preferably, copper is used.

The proportion of the metal component in the total catalyst may be between 0.1 and 10% weight, preferably between 1 and 10, in particular between 2 and 8% weight.

A palladium content of 1 to 5% weight, in particular 2 to 5% weight, relative to the overall weight of the catalyst has proved advantageous.

Preferably a combination of palladium with copper is used as the metal component of the catalyst. This combination has proved advantageous both in its activity in the hydrogenation of nitrite and nitrate and in its selectivity (selective hydrogenation to molecular nitrogen). The weight ratio of palladium to copper may be from 2:1 to 8:1, in particular from 3:1 to 5:1, and is preferably 4:1.

A mixture of catalyst particles containing solely palladium as the metal component and catalyst particles containing palladium and a metal of the copper group, in particular copper, as metal components may also be advantageously used to treat nitrate-polluted or nitrate- and nitrite-polluted water. The weight ratio of Pd-containing to Pd/Cu-containing catalyst particles may vary depending on the nitrate and nitrite content of the water and the quantity and composition of the metal components of the catalysts, and may be between 1:5 and 5:1, preferably between 1:2 and 2:1.

The nitrite and/or nitrate conversion capacity of the catalysts used according to the invention may vary depending on the initial nitrite and/or nitrate concentration, the pH value, the hydrogen gas concentration or hydrogen gas gassing rate and the temperature, and also the distribution of the metal component on the carrier material. For instance, with a palladium catalyst having 5% weight palladium on γ-aluminum oxide nitrite conversion rates of over 500 mg $NO_2^-$/h.g catalyst may be achieved. With a catalyst doped with palladium and copper containing 2% weight palladium and 0.5% weight copper on γ-aluminum oxide, for example, nitrate conversion rates of up to 100 mg $NO_3^-$/h.g catalyst may be achieved.

It is essential for the process of the invention that the catalyst is formed so that only the reduction itself is rate determining for the reaction which takes place in the water, and not processes like diffusion processes. The catalyst particles therefore must be so strongly permeated with macropores which act as effective diffusion paths or be so small that the diffusion in the aqueous medium takes place sufficiently rapidly. According to the invention, this is an essential requirement for avoiding ammonium formation. This requirement is met by catalysts used according to the invention having carriers which either consist of porous material which has a bimodal pore radius distribution with at least a 20% proportion, relative to the overall pore volume, of macropores having a minimum radius of 2,000 Å and/or which have a non-homogenous distribution of the metal with a concentration in the surface region or which are in the form of a powder having a particle diameter of less than 50 μm.

Materials having a pore radius distribution maximum in the small pores range having a radius of up to about 400 Å, for instance between about 50 and 350 Å, and a second pore radius distribution maximum in the macropores range having a radius of at least about 2,000 Å are suitable as porous carrier materials having a bimodal pore radius distribution. A carrier material having a pore radius distribution maximum in the small pore range having a radius of 50 to 300 Å, in particular 50 to 200 Å, has proved advantageous. Pore radii in the region of about 5,000 to 20,000 Å are advantageous for the macropore region. The macropore proportion of the bimodal carrier materials should be sufficiently high to assure rapid diffusion and may vary depending on the type and size of the carrier particles. For instance, bimodal carrier materials having a macropore proportion of between 20 and 80%, for instance 20 and 60%, preferably 40 and 60%, in particular 40 and 50%, relative to the overall pore volume, have proved advantageous.

Rapid diffusion of the reacting agents out from the catalytically active region of the catalyst may also be promoted by using catalysts in which there is a non-homogenous distribution of the metal on the carrier with a concentration in the surface region. For example, a non-homogenous metal distribution, in which the metal is concentrated on the surface with a depth of penetration of less than 50 μm, for instance 2 to 50 μm, has proved advantageous.

Rapid diffusion of the reacting agents out from the catalyst may also be achieved by using powdered catalysts, for instance catalyst powders, the particles of which have particle diameters of less than 50 μm, particularly less than 20 μm.

The BET surface areas of carrier materials with the above-described structures may vary within the range of about 20 to 360, in particular 30 to 300 m$^2$/g. For carrier materials having bimodal pore distribution the BET surface areas typically lie in the range from 20–30 to 200 m$^2$/g. and for powdered catalysts or catalysts having non-homogenous metal distribution in the range from 50 to 200 m$^2$/g.

Materials which are known per se for the production of catalysts may be used as carrier materials for the catalysts which can be used according to the invention, provided that they are water-resistant and meet the physical requirements described above. Thus, porous ceramic materials, for example water-resistant forms of aluminum oxides such as $\gamma$-Al$_2$O$_3$, silicon oxides and aluminosilicates or also activated carbon, are suitable as carrier materials.

Carrier particles of the most varied forms may be used. Thus, carriers in the form of powders, granules, spheres, beads, cylinders, hollow cylinders or hollow spheres can be used.

In particular particulate carrier materials of water-resistant and abrasion-resistant inorganic materials having a bimodal pore structure and/or non-homogenous metal distribution, i.e. carriers in the form of particles in the macro range, i.e. having particle sizes of at least 1 mm diameter, are suitable for industrial use in fixed bed reactors. The particle sizes may vary depending on the size of the catalyst bed and the reaction conditions. It is known that the smaller the particles are, the greater the pressure drop they will cause, whereas on the other hand the exchange capacity of a catalyst is known to decrease with increasing particle size. The particle sizes are desirably selected so that when the reaction is carried out industrially the pressure drop is as small as possible while maintaining sufficient exchange capacity. For example, particle sizes in the range from 1 to 5 mm have proved advantageous. These particles may be in the form of spheres, extruded pellets, hollow cylinders, hollow spheres or abrasion-resistant granules.

Powdered catalysts are suitable for embodiments of the process in which the introduction of the hydrogen gas takes place while the water is in contact with the catalyst, and for use in fluidized bed reactors.

Carrier materials with bimodal pore radius distribution may be produced in a known manner. For instance, in order to produce porous ceramic materials having a bimodal pore radius distribution, substances can be added to the carrier material which can be washed out or burned out again during the production process and thereby lead to the formation of macropores. Combustible organic substances such as wood dust, starch, sucrose or an ammonium salt of an organic acid such as ammonium acetate, or also soot, may be added as so-called burn-out substances, which burn out of the material during the subsequent firing of the carrier particles and leave behind macropores. This process is particularly suited to production of bimodal aluminum oxide carriers. For example, spherical aluminum oxide carriers may be obtained according to the processes described in DE-OS 25 04 463 and DE-OS 25 46 318 by mixing an aluminum oxide hydrosol with a base which can be hydrolysed under the influence of heat, e.g. hexamethylenetetramine, and mixing water-insoluble, combustible organic substances or soot, and optionally also alumina and/or alumina hydrate with the mixture, then dripping or spraying the mixture into a water-immiscible liquid at elevated temperature, for example temperatures between 60° and 100° C., allowing the resulting gel particles to age in the water-immiscible liquid at the precipitation temperature, and then washing and drying and thereafter calcining them.

A bimodal pore radius distribution may also be obtained in a known manner by a subsequent selective tempering of the carrier materials at temperatures in the region of about 600° to about 1,000° C. This process is suitable in particular for opening up pores in SiO$_2$ carriers. For instance, SiO$_2$ carrier materials having pore radii of between 50 and 350 Å may be converted into bimodal carriers by subsequent tempering. For example, a 20% proportion of macropores in the range of 5,000–50,000 Å can be produced in SiO$_2$ beads having pore radii of about 215 Å by 5 hours temperature treatment at 700° C. and a subsequent one hour tempering at 800° C.

The impregnation of the carrier particles with the metal component may take place according to conventional processes for producing catalysts. For instance, metal salts or complex metal compounds may be applied to the carrier material in an impregnating process, spraying process or precipitation process and be reduced in a known manner after drying and subsequent calcining. For instance, the carrier particles may be impregnated or sprayed with a solution or suspensions of metal salts or complex metal compounds in water or an organic solvent, for example a lower alcohol such as ethanol, or ketone, or mixtures thereof, after drying be optionally calcined at temperatures of up to 600° C., for example between 500° and 600° C., and are then reduced with a metal-free reducing agent, preferably hydrogen, or optionally also an organic reducing agent such as hydrazine with heat treatment at temperatures in the range of up to 550° C., for example between about 200° and 550° C.

The metal distribution on the carrier material may be varied in known manner by the manner of impregnation. For instance, when impregnating the carrier material with a solution of a soluble metal compound, the depth of penetration of the metal into the carrier material can be controlled by varying the impregnation time, for example between 1 and 30 min, and the solvent, for instance water or a more volatile organic solvent, for instance a lower alcohol such as ethanol, or mixtures thereof. Shorter impregnation times cause the metal to be primarily distributed only in the surface region of the carrier material. A substantial concentration of the metal on the surface region of the carrier material can also be achieved in a precipitation process, by spraying on a solution or suspension of the metal compound or by coating the carrier material with a liquid containing the metal compound. In the case of catalysts having a non-homogenous metal distribution with the metal concentrated in the surface region, so-called shell catalysts, the course of the reaction is considerably more independent of diffusion processes than in the case of catalysts having a homogenous metal distribution.

In order to avoid microbial growth and obstruction of the reactor, especially in continuous operation, it is recommended to first subject the water to germicidal treatment. Conventional processes for disinfecting water may be used for this purpose, for instance exposure to UV-light, ozonization or the addition of oxidizing agents such as hydrogen peroxide, chlorine, chlorine dioxide or hypochlorites.

In a preferred embodiment, the process is performed continuously. This preferred embodiment is characterized in that
   a) The nitrite-polluted and/or nitrate-polluted water having a predetermined oxygen, nitrite and/or nitrate content is introduced continuously into a dosing tank (A) in which the pH value is monitored and adjusted if necessary to a value of at most pH 8, preferably between pH 2 and pH 7, in particular pH 4 and pH 7, by adding acid,
   b) before or after passing through the dosing tank (A), the water is passed through a disinfecting apparatus, in particular a UV discharge lamp (B), to kill microorganisms, and
   c) the thusly treated water is passed via a flow-regulating pump (C) with a variable pumping capacity through one or more reaction units (D), each containing a gassing vessel (E) and a reactor (F), wherein the water is first passed into the gassing vessel (E) and is gassed therein and thoroughly mixed with hydrogen gas, optionally under pressure, and subsequently is conducted through the reactor (F) containing a catalyst bed with the metal catalyst, whereby the water passes through a total of as many reaction units (D) as are needed for reducing the oxygen content and the nitrite and/or nitrate content of the water, whereby in stage a) and in any case where the water is conducted from one reaction unit (D) into a subsequent reaction unit (D), the pH-value of the water is adjusted in each case so that an increase in the pH value in the subsequent reaction unit resulting from the reaction leads to a pH of at most 8, and/or in the reactor (F) itself the pH value is monitored and if necessary such a quantity of acid is added that the pH value does not exceed pH 8 and is preferably kept substantially constant.

If desired, for complete removal of the nitrite and/or nitrate content, the water may be passed successively through a plurality of reaction units (D) arranged in series in cascade form, with the interposition of pH-measuring and adjusting cells. In this case the pH value of the water flowing out of one reaction unit (D) is re-adjusted before it enters the subsequent reaction unit (D). In another process, water which has only been partially relieved of its load in a first pass through a reaction unit (D) can be recycled back into the reaction unit. If desired, the flow of water flowing out of the UV discharge lamp may be divided and passed through a plurality of adjacent reaction units (D). Desirably, the water after leaving the dosing tank (A), is first passed through a through-flow vessel (A'), in which measuring probes are provided for analytic monitoring of the water, for example for determining redox potential, nitrite and/or nitrate content, pH value etc. Furthermore, it may be advantageous to both insert a flow meter before entry into the reaction unit (D) as well as inserting additional measuring stations, for example through-flow vessels provided with measuring probes, within the reaction unit between the gassing vessel and the reactor, to monitor the analytical data and the pressure.

The water flowing out of the reactor (F) may be passed through another through-flow vessel (G) provided with measuring probes, for instance probes for determining the pH value, the redox potential, the hydrogen content, the oxygen content, the nitrate content, the nitrite content and/or the ammonium content, for monitoring. If operating at elevated pressure, the water may then undergo pressure release to reach normal pressure.

The resulting water may be processed further in a known manner. The water is practically free of oxygen. It may be used directly for purposes for which oxygen-free water is required, for example as brewery water. If desired, in the treatment of drinking water, it may also be aerated in a known manner to reabsorb oxygen, whereby small residual amounts of gasses which are still dissolved are removed as well.

Furthermore, it is an object of the invention to provide an installation for carrying out the continuous process described above for removal of the nitrite and/or nitrate content from water characterized in that it comprises:
   a') a dosing tank (A) which has a liquid inlet for introducing the water and a liquid outlet for removing the water, and is provided with a pH-measuring and adjusting device,
   b') a disinfecting apparatus, preferably a UV discharge lamp (B),
   c') at least one reaction unit (D) each of which is formed of one gassing vessel (E) which is provided with a liquid inlet for the water and at the opposite end with a liquid outlet for the water and has an inlet for hydrogen gas which leads through a permeation membrane, and connected thereto a reactor (F) containing a catalyst bed with a catalyst as described above, which reactor has a liquid inlet for the water and a liquid outlet for the water and is optionally provided with a pH-measuring and adjusting device,
   whereby conduits for transporting the water connect the dosing tank (A) which is described under a') with the disinfecting apparatus (B) described under b') and connect the latter or the dosing tank (A) via a pump (C) having a variable pumping capacity to the gassing vessel (E) of the reaction unit (D) described under c') and connect this gassing vessel with the reactor (F), optionally through a through-flow vessel provided with measuring probes, and if there is a plurality of reaction units (D) in series, these are connected to each other by a conduit which may optionally be provided with a pH-measuring and adjusting device.

If desired, additional measuring stations for analytical data on the water flowing therethrough, pressure gauges, flow meters and/or temperature gauges may be provided in the conduits.

BRIEF DESCRIPTION OF THE DRAWINGS

The invention will be described in further detail with reference to the accompanying FIG. 1 which is a schematic representation of an apparatus according to the invention for carrying out the process of the invention.

DETAILED DESCRIPTION OF PREFERRED EMBODIMENTS

Figure 1:
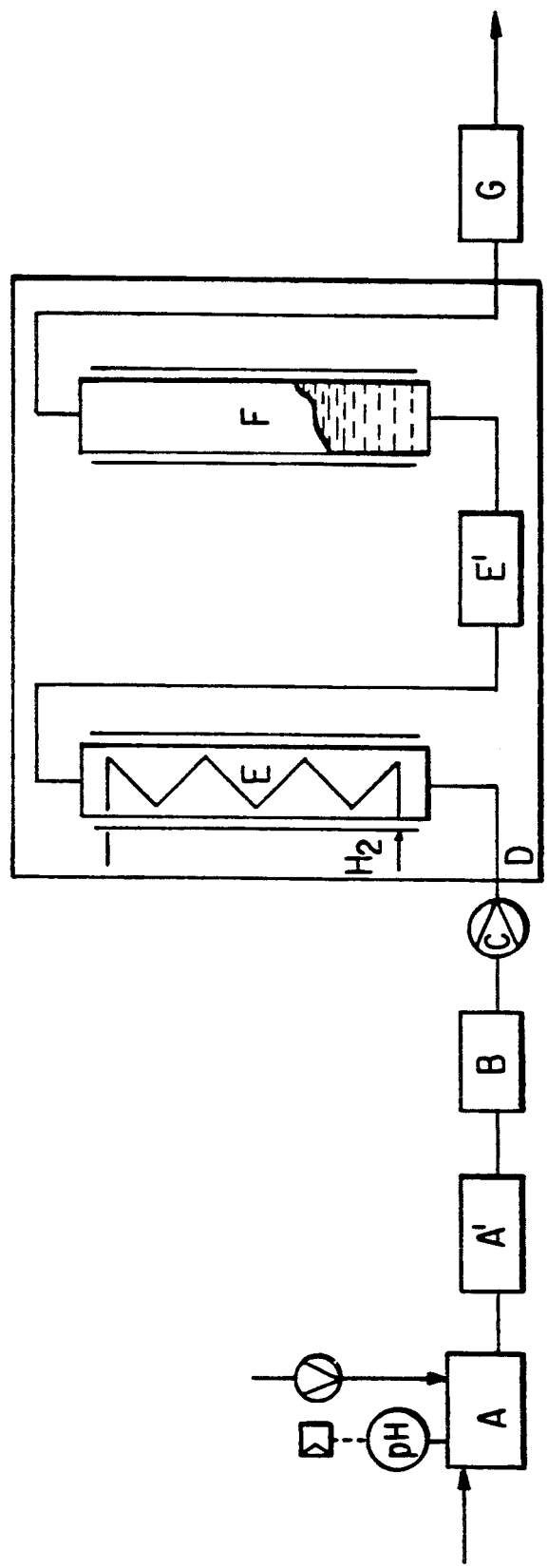

FIG. 1 shows a suitable embodiment of such an installation. The water may for instance be passed from a storage vessel into the dosing tank (A) in which the pH value is determined and adjusted if necessary.

If desired, the water can then be passed through the through-flow vessel (A') which may contain a plurality of measuring probes. In this vessel, the oxygen content and the nitrite and/or nitrate content, the redox potential and, if desired, other analytical data on the water may be determined, which may serve to regulate the flow rate and the quantity of hydrogen to be added.

Then the water is passed through a UV discharge lamp (B) to substantially disinfect it in order to avoid microbial growth in the gassing vessel and/or in the reactor in continuous operation. Then the water is passed through a pump (C) having a variable pumping capacity into the gassing vessel (E) of the reaction unit (D). The pump may optionally serve simultaneously to increase the pressure in the following reaction unit (D). The quantity pumped may be monitored by a flow meter. The gassing vessel is provided with a device for permeation gassing. This may be a flat membrane or a tube of unreinforced and/or fabric-reinforced silicone rubber. The gassing vessel is desirably also provided with a stirrer. In a preferred embodiment, permeation membrane tubes are placed in circles on top of each other in the gassing vessel and a magnetically driven stirring shaft is provided in the center of the vessel. The volume of hydrogen introduced may be monitored by a flow meter. In the gassing vessel, the flow of water is continuously loaded with hydrogen gas.

From the vessel, the water laden with hydrogen flows into the reactor. If desired, the water may thereby again pass through a (E') with measuring probes of monitoring analytical parameters such as, for example, pressure, redox potential and hydrogen concentration, if desired. The reactor may be constructed as a fixed bed reactor which is filled with the catalyst material, or also as a fluidized bed or moving bed reactor.

In another embodiment, the gassing vessel may contain an insert which is especially suited for receiving the catalyst, and may be used as a combined gassing/reactor module.

The gassing and reactor area may be designed for up to 10 bar elevated pressure. The gassing and reactor module may be temperature controlled, for example by being provided with a water jacket. The water flowing out of the reactor may be passed through another through-flow vessel (G) which may contain measuring probes to again monitor the analytical data of the water.

Using the process according to the invention, it is possible to almost completely remove nitrite and/or nitrate from water, for instance in the treatment of ground water, without environment-polluting by-products being produced. The process of the invention is characterized in that the reduction of the nitrite and/or nitrate in the aqueous medium by hydrogenation with the aid of the catalysts used according to the invention proceeds selectively to produce molecular nitrogen. In particular, in the performance of the process of the invention, the formation of ammonium, which may occur as a secondary reaction or subsequent reaction of hydrogenation, is largely avoided, so that ammonium contents below the recommended drinking water limit values for ammonium (0.5 ppm) can be achieved in the treated water.

For achieving largely $NH_4$-free water quality, particulate catalysts have proved particularly suitable which have particle diameters in the range from 1 to 5 mm and comprise a carrier material which consists of water-resistant and abrasion-resistant inorganic materials selected from the group consisting of aluminum oxides, preferably γ-aluminum oxide, silicon oxides, and alumosilicates and has a bimodal pore structure having a pore radius distribution maximum in the mesopore range having a radius between 50 and 350 Å, particularly between 50 and 300 Å, and a second pore radius distribution maximum in the macropore range having a radius of more than 5,000 Å and which further comprise a metal component comprising 1 to 5, preferably 2 to 5, weight % palladium relative to the overall catalyst weight, and optionally additionally comprise an amount of copper from one-fifth to one-third, particularly about one-fourth, of the amount of palladium.

Powdered catalysts having particle diameters in the range of 2 to 50 μm, preferably below 20 μm, made of water-resistant carrier materials having pore radii in the range of 50 to 350, in particular 50 to 300 Å, and the metal components given above are also suitable. Likewise, shell catalysts made of water-resistant and carriers having a concentration of the metal component in the surface region up to 2 to 50 μm depth of penetration are also suitable.

The following examples will serve to explain the invention in greater detail without limiting its scope.

EXAMPLE 1

Removal of nitrite from water

The reaction was performed in a discontinuous measuring apparatus which contained a temperature-controlled 500 ml reactor having a magnetic stirrer, in which hydrogen could be introduced at the base through a porous plastic tube with a needle valve to regulate the volume of hydrogen flow. Furthermore, the apparatus was provided with a pH-measuring and adjusting unit, with a pH-measuring electrode located inside the reactor which could measure the variation occurring during the reaction in pH value from the initial pH value and offset the change in the pH value by adding dilute aqueous hydrochloric acid solution through a dosing device. The volume of acid added to keep the pH value constant, which is proportional to the quantity of nitrite reacted, was recorded on a measurement recorder.

500 ml water having a nitrite content of 100 ppm and a pH of 6.0 and 2.0 g of a palladium/γ-aluminum oxide catalyst powder (5% Pd on γ-$Al_2O_3$, particle size between 1 and 20 μ, BET surface area 90 $m^2$/g, manufacturer Aldrich) were introduced into the reactor. The temperature in the reactor was set at 10° C., and gassing was carried out with hydrogen at a gassing rate of 10 ml/min. After 20 min the nitrite was completely converted. The specific nitrite conversion rate of the catalyst until complete reaction of 50 mg nitrite in 500 ml water was calculated for one hour and 1 g catalyst. After the experiment had ended, the ammonium concentration of the solution was determined photometrically.

Specific nitrite conversion rate: 67 mg $NO_2^-$/h.g catalyst, $NH_4$ concentration in the solution: 0.3 ppm.

EXAMPLE 2

Removal of nitrite from water

The reaction was carried out in the discontinuous measuring apparatus described in Example 1.

500 ml water having a nitrite content of 100 ppm and a pH of 6.0 and 8.0 g of one of the catalysts listed below (particle size between 1 and 20 μ were introduced into the reactor. The temperature in the reactor was set to 10° C., and gassing was carried out with hydrogen at a gassing rate of 0.5 l/min. The specific nitrite conversion rate of the catalysts until complete reaction of 50 mg nitrite in 500 ml water was calculated for 1 hour and 1 g catalyst.

| No. | Catalyst | Specific nitrite conversion rate mg $NO_2^-$/h. g catalyst |
|---|---|---|
| 2a | Pd 5% on activated carbon* | 469 |
| 2b | Pd 5% on $\gamma$-$Al_2O_3$* (= the catalyst used in Example 1) | 208 |

*Manufacturer Aldrich

EXAMPLE 3

Removal of nitrite from water

The specific nitrite conversion rate in water of the palladium and rhodium catalyst listed in the table below was determined according to the method described in Example 1.

In order to produce the catalysts, a metal compound was applied to the relevant carrier material according to one of the following methods a)–c):

a) The carrier material with a sufficient quantity of an aqueous tetrammonium palladium (II) hydroxide solution (Pd content 0.1–0.6% weight) was evaporated to dryness in a rotary drum. The material was subsequently dried for about 16 hours at 80° C.

b) The carrier material was impregnated with a sufficient quantity of a 2 to 8% weight ethanolic $PdCl_2$ solution or an Rh (III) nitrate solution in a water/ethanol mixture for 1–2 min at room temperature, separated off and then dried in air. If not all the impregnation solution had been absorbed in the impregnation period, impregnation with the remaining impregnation solution was repeated after the subsequent calcining.

c) A suspension of 0.33 g $PdCl_2$ and 3.0 g aluminum oxide (Condea, type SD) in 5 ml deionized water was applied to 10 g of the carrier material was subsequently dried for about 16 hours at 80° C.

After the application of the metal compound, the carrier materials were calcined for 1 hour at temperatures between 500° and 600° C. Then the catalysts were reduced by heating for 10 hours at 350° C. in a current of hydrogen/nitrogen (volume ratio $H_2:N_2=1:4$, flow 120 l/h).

TABLE

| No. | % weight Pd or Rh | Carrier material | Particle shape and details of size in mm | BET $m^2$/g | Production method | Specific nitrite conversion rate mg $NO_2^-$/h. g catalyst |
|---|---|---|---|---|---|---|
| 3a | 2.13% Pd | $SiO_2$ 1) | Beads $\phi$ 0.1–0.2 | 300 | a | 13.3 |
| 3b | 5.91% Pd | $Al_2O_3$ 2) high density | Extruded products $\phi$ 1.5 Length approx. 4 | 200 | b* | 4.2 |
| 3c | 2.0% Pd | $Al_2O_3$ 3) | Beads $\phi$ 0.1 | 157 | b | 50 |
| 3d | 2.0% Pd | $Al_2O_3$ 4) | Spheres $\phi$ 1.0–1.5 | 175 | c | 9.4 |
| 3e | 3.0% Pd | $Al_2O_3$ 5) | Hollow cylinders $\phi$ external 1.5 $\phi$ internal 0.55 Length approx. 5 | 180 | b | 11 |
| 3f | 5.0% Rh | $Al_2O_3$ 5) | Hollow cylinders $\phi$ external 1.5 $\phi$ internal 0.55 Length approx. 5 | 180 | b | 6.5 |
| 3g | 2% Pd | $Al_2O_3$ 5) | Hollow cylinders ground $\phi$ 0.4–1.0 | 180 | b** | 18.7 |
| 3h | 2% Pd | $SiO_2$ 6) | Beads $\phi$ 0.1–0.2 | ~45 | b | 33.2 |
| 3i | 2% Pd | bimodal $SiO_2$ 7) | Beads $\phi$ ~0.1 | ~40 | b*** | 13.3 |
| 3j | 2% Pd | bimodal $SiO_2$ 7) | Beads $\phi$ ~0.1 | ~40 | a | 22.2 |

1) $SiO_2$ beads (type MP 100, manufacturer Kali-Chemie AG)
2) $\gamma$-$Al_2O_3$ high density carrier material ($\gamma$-$Al_2O_3$ type HD, manufacturer Kali-Chemie AG)
3) $\gamma$-$Al_2O_3$ beads Puralox ® (type SCC/a30/170, manufacturer Condea)
4) $\gamma$-$Al_2O_3$ spheres (type GS 1038, manufacturer Kali-Chemie AG)
5) hollow $\gamma$-$Al_2O_3$ cylinders (type K500, manufacturer Dr. C. Otto)
6) $SiO_2$ beads (type 540, manufacturer Kali-Chemie AG)
7) $SiO_2$ beads (type 430, manufacturer Kali-Chemie AG) having a BET surface area ~60 $m^2$/g were heated for 7 hours at 700° C. and subsequently for 1 hour at 800° C. to produce a bimodal pore structure by partial thermal pore expansion. BET surface area after thermal expansion = ~40 $m^2$/g.
*impregnation process repeated 4 times
**impregnation time 5 min
***In order to absorb the remaining slight excesses of impregnation solution after an impregnation time of 1 min, the catalyst was treated with the remaining solution in a rotary drum with hot air until surface drying was achieved.

EXAMPLE 4

Removal of nitrate from water

The reaction was carried out in the discontinuous measuring apparatus described in Example 1, which was additionally provided with a nitrate measuring electrode. In order to produce a palladium/copper/$\gamma$-aluminum oxide catalyst, 25 g of the carrier material (hollow $\gamma$-$Al_2O_3$ cylinders, external diameter 1.5 mm, internal diameter 0.55 mm, length approx. 5 mm, BET surface area 180 $m^2$/g, manufacturer Dr. C. Otto) used for catalyst 3e were impregnated for 2 min with 25 ml of a solution of 6.67% $PdCl_2$ and 2.27% $Cu(NO_3)_2.3H_2O$ in ethanol, and were further processed as described in Example 3. A catalyst having a Pd content of approximately 2% weight and a Cu content of approximately 0.6% weight was obtained.

500 ml water having a nitrate content of 100 ppm and a pH of 6.0 and 2.0 g of the palladium/copper/$\gamma$-aluminum oxide catalyst obtained above were introduced into the reactor. The temperature in the reactor was set at 10° C., and gassing with hydrogen was carried out at a gassing rate of 10 ml/min while stirring at a stirring rate of 200 rpm. The specific nitrate conversion rate of the catalyst until complete breakdown of 50 mg nitrate in 500 ml water was calculated for 1 h and 1 g catalyst. The quantity of ammonium formed after complete conversion of nitrate was determined photometrically.

Specific nitrate conversion rate: 2.5 mg $NO_3$/h.g catalyst, $NH_4$ concentration in the solution: 0.3 ppm.

EXAMPLE 5

The specific nitrate conversion rate of the following catalysts in water was also determined according to the method described in Example 4.

| No | Catalyst | Specific nitrite conversion rate mg $NO_2^-$/h. g catalyst |
|---|---|---|
| 5a | 5% Rh on $\gamma$-$Al_2O_3$ = identical to catalyst No. 3f | 4.2 |
| 5b | 2% Pd and 0.6% Cu on $\gamma$-$Al_2O_3$ grain size $\phi$ 0.4-1.0 mm. BET 180 $m^2$/g | 2.8 |
| 5c | 2% Pd and 0.5% Ag on $\gamma$-$Al_2O_3$ beads* grain size $\phi$ 45-90 $\mu$m. BET 211 $m^2$/g | 36.1 |
| 5d | 2% Pd and 0.5% Cu on $\gamma$-$Al_2O_3$ beads* grain size $\phi$ 45-90 $\mu$m. BET 211 $m^2$/g | 52.1 |
| 5e | 2% Rh on $\gamma$-$Al_2O_3$ beads* grain size $\phi$ 45-90 $\mu$m. 211 $m^2$/g | 22.0 |

*$\gamma$-$Al_2O_3$ beads Puralox ® (type SCC/a30/220), manufacturer Condea

In order to produce catalyst 5 b, the carrier material described for catalyst 3 g was treated using the method described in Example 4. In order to produce catalysts 5 c and 5 d, the carrier materials were treated with an aqueous tetrammonium palladium (II) hydroxide solution analogously to Example 3 a) to apply the palladium, and they were impregnated with an appropriate metal nitrate solution analogously to Example 4, dried and treated further as described in Example 3 to apply the metal of the copper group. Catalyst 5e was produced analogously to Example 3 b).

EXAMPLE 6

Continuous removal of nitrite from water

In an installation as shown in FIG. 1, water was introduced continuously from a 300 l capacity storage vessel containing the water to be treated into the 20 l capacity dosing tank (A) of the installation. The water had a nitrite content of 6 mg/l and a temperature of 10° C. The dosing tank was provided with a pH-meter and connected via a dosing device to a storage vessel containing 1.0N hydrochloric acid. The pH of the water was adjusted to pH=6 in this dosing tank. From the dosing tank, the water flowed into the through-flow vessel (A'). Measuring probes to measure the temperature, redox potential and the $O_2$ content were provided in the through-flow vessel. The following values were measured: redox potential=23.8 mV, $O_2$ content=8.5 mg/l. From the through-flow vessel, the water was passed into a UV discharge lamp (B) and from there was conveyed by a pump (C) having a flow rate of 4 l/h and at an elevated pressure of 1 bar into the gassing vessel (E) of the reaction unit (D). The gassing vessel had a height of 50 cm and a diameter of 5 cm. 10 m of a permeation membrane tube made of silicone rubber were placed in circles one above the other in the reactor. In the center of the reactor there was a magnetically operated stirring shaft in order to improve the uptake of gas. The water flowing through the gas vessel was loaded with hydrogen gas at an applied hydrogen pressure of 3 bar with a gassing rate of 80 ml/h. This corresponds to a 20% $H_2$ excess. The water which was saturated with hydrogen was passed out of the gassing vessel through a through-flow vessel (E') provided with measuring probes. The redox potential measured at this point was −80 mV. The water was passed on into the fixed bed reactor (F). The reactor had a height of 30 cm and a diameter of 2.5 cm (corresponding to a volume of 230 ml). The reactor contained 10 g of catalyst No. 3g. After the water emerged from the reactor (F), it passed through a through-flow vessel (G) provided with measuring probes, in which the pH value and nitrite content of the water were determined. The water had a pH of 6.8. The nitrite content had decreased to less than 0.1 mg/l.

The foregoing experiment was repeated with the same starting water with the following parameters changed:

Water flow rate: 15 l/h

Operating pressure: 3 bar

H2 gassing rate 300 ml $H_2$/h at 6 bar $H_2$ pressure.

The water emerging from the reactor had a pH of 6.8 and a nitrite content of $\leq$0.1 mg/l.

EXAMPLE 7

Continuous removal of nitrate from water

In an installation as shown in FIG. 1, the tap water to be treated, having a nitrate content enriched to 100 mg/l and a temperature of 10° C., was continuously introduced from a 300 l storage vessel into the 20 l dosing tank (A) of the installation. The dosing tank was provided with a pH-meter and was connected to a storage vessel containing 1.0N hydrochloric acid via a dosing device. The pH value of the water was adjusted to pH=6 in this dosing tank. From the dosing tank, the water flowed into the through-flow vessel (A'). Measuring probes to measure the temperature, redox potential and the $O_2$ content were provided in the through-flow vessel. The following values were measured: redox potential=390 mV, $O_2$ content=7.5 mg/l. From the through-flow vessel, the water was passed into a UV discharge lamp (B) and from there was passed via a pump (C) having an operating pressure of 6.5 bar and a flow rate of 2.4 l/h into the gassing vessel (E) of the reaction unit (D). The gassing vessel had a height of 50 cm and a diameter of 5 cm. 10 m of a permeation membrane tube made of silicone rubber were placed in circles one above the other in the reactor. In the center of the reactor there was a magnetically operated stirring shaft in order to improve the uptake of gas. The flowing water was loaded with hydrogen gas in the gas vessel at an applied hydrogen pressure of 8 bar and a gassing rate of 262 ml/h. This corresponds to a 10% H₂ excess. The water which was loaded with H₂ gas was passed out of the gassing vessel through a through-flow vessel (E') provided with measuring probes. The redox potential measured at this point was −108 mV. The water was passed on into the fixed bed reactor (F). The reactor had a height of 30 cm and a diameter of 2.5 cm (corresponding to a volume of 230 ml). The reactor contained 12.0 g of catalyst No. 5b. After the water emerged from the reactor (F), it was passed through a through-flow vessel (G) provided with measuring probes, in which the pH value and the nitrite and nitrate content were determined. The water flowing out had a pH of 7 and the nitrate content had been decreased to a residual nitrate concentration of $\leq 5$ mg/l. The emerging water was nitrite-free.

The specific nitrate conversion rate with this continuous process was 19 mg $NO_3^-$/h.g catalyst. It was thus about 7 times the specific nitrate conversion rate of the same catalyst in the discontinuous process of Example 5 which did not use elevated pressure.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A catalyst consisting of a porous inorganic carrier material impregnated with a metal component selected from the group consisting of palladium, rhodium, mixtures of palladium and rhodium, and mixtures of palladium and a metal of the copper group, wherein said carrier material has a bimodal pore radium distribution having a first pore radiums distribution maximum in the pore size range having a radius of up to 400 Å and a second pore radius distribution maximum in the macropore size range having a radius of at least 2,000 Å, with a proportion of at least 20%, relative to the overall pore volume, of macropores having a minimum radiums of 2,000 Å.

2. A catalyst according to claim 1 wherein said first pore radiums distribution maximum is in the pore size range having a radius of 50 to 350 Å.

3. A catalyst according to claim 1, wherein said carrier has a bimodal pore radius distribution with a first pore radius distribution maximum in the pore size range having a radius of 50 to 300 Å and a second pore radius distribution maximum in the macropore size range having a radius of 5,000 Å to 20,000 Å.

4. A catalyst according to claim 3, wherein first pore radius distribution maximum is in the pore size range having a radius of 50 to 200 Å.

5. A catalyst according to claim 1, wherein said carrier has a macropore proportion of between 20 and 60% relative to the overall pore volume of said carrier.

6. A catalyst according to claim 5, wherein said carrier has a macropore proportion between 40 and 50% relative to the overall pore volume of said carrier.

7. A catalyst according to claim 1, wherein said carrier material is selected from the group consisting of aluminum oxide, silicon oxide and aluminosilicates.

8. A catalyst according to claim 7, wherein said carrier material comprises γ-aluminum oxide.

9. A catalyst according to claim 1, wherein said metal of the copper group is selected from the group consisting of copper and silver.

10. A catalyst according to claim 9, wherein said metal of the copper group is copper.

11. A catalyst according to claim 1, wherein said metal component comprises from 0.1 to 10 weight-% of the total catalyst.

12. A catalyst according to claim 1, wherein said catalyst has a palladium content of 1 to 5 weight-% relative to the overall weight of the catalyst.

13. A catalyst according to claim 12, wherein said catalyst has a palladium content of 2 to 5 weight-% relative to the overall weight of the catalyst.

14. A catalyst according to claim 1, wherein said metal component comprises a mixture of palladium and copper.

15. A catalyst according to claim 14, wherein the weight ratio of palladium to copper is between 2:1 and 8:1.

16. A catalyst according to claim 15, wherein the weight ratio of palladium to copper is between 3:1 and 5:1.

17. A catalyst according to claim 1, wherein said catalyst comprises a mixture of carrier particles impregnated with palladium and a metal of the copper group and of carrier particles impregnated soley with palladium.

18. A catalyst according to claim 17, wherein said metal of the copper group is copper.

19. A catalyst according to claim 17, wherein the weight ratio of carrier particles impregnated solely with palladium to carrier particles impregnated with palladium and a metal of the copper group is from 1:5 to 5:1.

* * * * *